A. W. MOODY.
PISTON OPERATING MECHANISM FOR ENGINES, PUMPS, AND COMPRESSORS.
APPLICATION FILED MAR. 10, 1919.

1,364,508.

Patented Jan. 4, 1921.

Witness:
David H. Fletcher.

Inventor
Axel W. Moody
By Harry Irwin Cromer
Atty.

A. W. MOODY.
PISTON OPERATING MECHANISM FOR ENGINES, PUMPS, AND COMPRESSORS.
APPLICATION FILED MAR. 10, 1919.

1,364,508.

Patented Jan. 4, 1921.
5 SHEETS—SHEET 2.

A. W. MOODY.
PISTON OPERATING MECHANISM FOR ENGINES, PUMPS, AND COMPRESSORS.
APPLICATION FILED MAR. 10, 1919.

1,364,508.

Patented Jan. 4, 1921.

A. W. MOODY.
PISTON OPERATING MECHANISM FOR ENGINES, PUMPS, AND COMPRESSORS.
APPLICATION FILED MAR. 10, 1919.

1,364,508.

Patented Jan. 4, 1921.
5 SHEETS—SHEET 5.

UNITED STATES PATENT OFFICE.

AXEL W. MOODY, OF ELGIN, ILLINOIS.

PISTON-OPERATING MECHANISM FOR ENGINES, PUMPS, AND COMPRESSORS.

1,364,508.  Specification of Letters Patent.  Patented Jan. 4, 1921.

Application filed March 10, 1919. Serial No. 281,644.

*To all whom it may concern:*

Be it known that I, AXEL W. MOODY, a citizen of the United States, residing at Elgin, in the county of Kane and State of Illinois, have invented certain new and useful Improvements in Piston-Operating Mechanisms for Engines, Pumps, and Compressors, of which the following is a specification.

This invention relates to that class of piston operating mechanisms having a driving or driven shaft operatively connected with a piston or pistons mounted in suitable cylinders having suitable inlet and outlet openings, by means of cam mechanism operatively connected with the shaft, and pitman mechanism operatively connected with the cam mechanism and with the piston or pistons, and to engines, pumps or compressors provided with such piston operating mechanism.

The principal object of this invention is to provide a simple, economical and efficient piston operating mechanism for engines, pumps and compressors, and an improved simple and efficient form of engine, pump or compressor provided therewith.

A further object of the invention is to provide a piston-operating mechanism or piston-operated mechanism comprising inner and outer relatively rotatable cam members in operative engagement with each other and operatively connected with shaft and piston mechanism, and of such construction as to enable cam or guiding members having sinuous or wave-like cam surfaces, slots or guiding surfaces, or having curved cam or guiding slot or surface portions of varying curvature or of wave-like or sinuous form to be dispensed with.

Other and further objects of the invention will appear from an examination of the drawings and from the following description and claims.

The invention consists in the features, combinations, and construction and arrangement of parts herein described and claimed.

In the accompanying drawings.

Fig. 10ª shows a modification of the parts shown in Figs. 8, 9, and 10, with the inner and outer relatively rotative cam and collar members assembled, and shown in central section, as in Fig. 3.

In constructing an engine, pump or compressor provided with piston-operating mechanism made in accordance with my invention, I provide a casing or piston cylinder 1 forming a suitable number—by preference three—of piston chambers 2, which are arranged in parallel relation, and at equal distances from each other and from the longitudinal axial center of a main driving or driven shaft 3, which is journaled in suitable bearings 4, 5, in the casing or frame 1, and in parallel relation to the longitudinal centers of the piston chambers 2. The casing 1 is provided with a longitudinal central or axial bore 6 adapted to admit the shaft 3 which has annular shoulders or collars 7 and 8 thereon adapted to limit or prevent the movement of the shaft endwise with respect to its bearings, and to retain it in proper operative position with respect to the bearings and casing.

Slidably mounted in each piston chamber or cylinder 2 is a piston 9 provided with suitable packing which may be in the form of packing rings 10, which may be of any well known or desired suitable form. I prefer to employ three pistons located at equal distances from each other and at equal distances from the axial center of the shaft 3, and each in position to reciprocate longitudinally of and in a direction parallel with respect to the axis or longitudinal center of the shaft. Each piston 9 is provided with a pitman 11, one end of which is connected with the corresponding piston by means of a ball and socket joint, and the other end of which is operatively connected with an oscillating member 12 by means of a ball and socket joint or suitable means for forming an articulate connection between the pitman mechanism and such oscillating member 12.

The connecting means whereby the end of each pitman is connected with the corresponding piston is, by preference, constructed as follows: A socket member 13 is fixed to the inside of each piston, and a ball or spherical ball-joint member 14 is fixed to the adjacent extremity of the corresponding pitman. A removable socket member 15 having a concave bearing surface adapted to fit in slidable engagement or articulate relation to the surface of the ball 14 is mounted in position to encircle the neck or end of the pitman and ball, and to form, together with the socket member 13, a suitable socket for the ball. The removable socket member 15 is, by preference in the form of a threaded ring or collar adapted to encircle the pitman and the engaged peripheral portion of the ball, and in threaded engagement with the piston. The opening in the annular member 15 through which the pitman extends is sufficiently large to permit the desired freedom of movement of the pitman in said opening, but of such dimensions as to prevent the ball from escaping from its socket or bearing.

The opposite end of each pitman 11 is provided with a socket 16 which is, by preference, in the form of a hollow sphere on the inside, the socket being formed by means of an enlarged hollowed out end portion 17 of the pitman, and a removable end bearing or socket member 18 secured to said enlarged end portion of the pitman by means of screws 19 or other ordinary or desired suitable securing means. The socket members or bearing members 17 and 18 thus form a concave or spherical socket which has a radial or lateral opening 20 which is elongated in a direction longitudinally of the pitman. This elongated radial slot or opening in the side of the hollow end of the pitman is of less width than the spherical recess or inner socket with which it communicates, and is adapted to admit and permit the free movement of a radial arm 21 which is fixed to and projects outward radially from the oscillating collar or annular outer relatively rotatable member 12. A ball or spherical ball joint member 22 is mounted upon or formed in one integral piece with each radial arm 21, and is swiveled or rotatively mounted in the corresponding socket 16, there being one radial arm 21 and ball 22 for each pitman 11. An inner guiding or cam member 23 is mounted upon and secured to the shaft 3 so as to rotate with the shaft. This cam may be made in one integral piece with the shaft; but for convenience in assembling, I prefer to make the cam member 23 in two pieces each substantially in the form of a hemisphere, the two halves being secured together by means of a screw 24' and to the shaft by means of a transverse pin 24, inserted into suitable openings in the cam member or members and in the shaft, respectively, the two sections of the cam each having an opening therethrough adapted to admit and fit tightly in engagement with the shaft, so that the cam is firmly secured in fixed relation to the shaft.

The cam 23 has a circular peripheral groove 25, the opposite side walls 26 of which are parallel, and by preference in inclined or oblique relation to each other so that the slot is somewhat V-shaped in cross-section, and adapted to engage and form a guide for the similarly inclined or V-shaped inner cam-engaging portion 27 of the relatively rotatable collar or outer annular oscillating cam-engaging member 12.

The collar 12, when constructed as shown in the drawings, is in the form of a ring, the outer periphery of which is angular, or triangular in form, and the inner perimeter of which is tapered or V-shaped and circular, and adapted to extend into and in slidable or rotative engagement with the walls of the slot or groove 25 in the cam member 23. And the cam member 23 is, by preference, substantially spherical. The peripheral groove 25 is in the form of a true circle in a plane oblique with respect to the axis of the shaft 3 on which the spherical cam member 23 is concentrically mounted and rigidly secured; and it follows, of course, that the outer oscillating collar member 12, which is constantly in the same plane with the peripheral groove 25, is likewise, at all times in a plane which is oblique with respect to the axis of the shaft 3 and the spherical inner cam or collar-engaging member 23. A guide 28 is fixed to the casing 1 in position to extend in parallel relation to the axis of the shaft 3, and is provided with a segmental guiding slot 29 in its inner side facing and open in the direction of the axial center of the spherical or inner cam 23, and in parallel relation to the axis of said cam or spherical peripherally grooved inner piston operating member 23. The member 12 is provided with a guiding arm 30 which projects outward radially from the outer face of the collar member 12 and into the guiding slot 29, and an anti-friction roller 21 encircles said radial guiding arm and is located between the parallel walls of the segmental guiding slot 29, said roller being held in place by a headed screw 32. (See Fig. 3.)

The slot 29 describes an arc of a circle which is in the same plane with the axis of the cam member 23 and shaft 3, and the center of which is the axial center of the cam or spherical peripherally grooved member 23.

It is plain that, with the parts constructed and arranged as above described, the rotation of the shaft 3 with the casing 1 stationary, or the rotation of the casing 1, while the shaft 3, with its peripherally grooved spherical piston-operating member or cam 23 is stationary, will cause the pistons to reciprocate, and will cause the collar 12 with its piston-operating radial arms, and its ball-joint connections with the pitman mechanism, to have an oscillating movement which will cause the pistons to reciprocate in a direction parallel to the axis of the shaft;

that, by driving the pistons by means of pressure fluid in the form of gas, air or steam, the shaft may be rotated with respect to the casing, or the casing may be rotated with respect to the shaft when the device is to be used as an engine or motor; and that by driving the shaft by means of any desired form of motor engine, or source of power, the piston mechanism may be reciprocated, as when the device is to be used as a pump or compressor.

Figure 1:
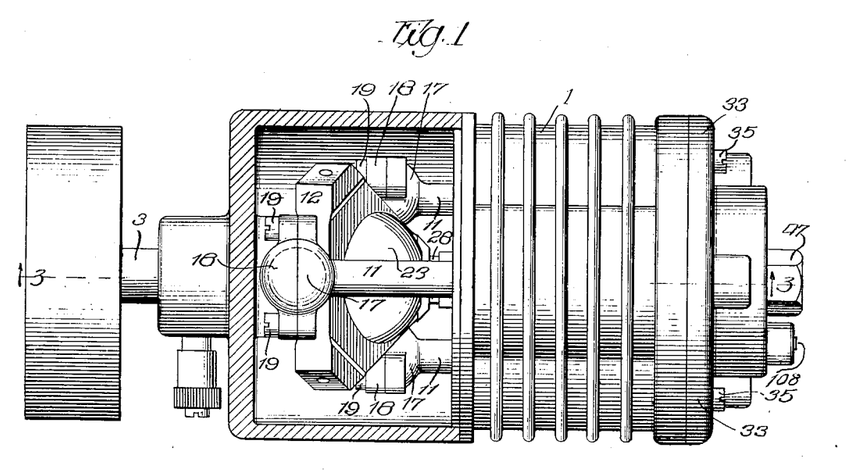
Figure 1 is a view of an engine, pump or compressor constructed in accordance with my invention, showing the same as it would appear in plan view, if placed in horizontal position with a given side uppermost, and with the casing in which the piston-operating mechanism is located, shown in central longitudinal section, although it is obvious that the device is capable of being mounted and used in upright or any desired inclined position; and the cylinder head shown in said figure is of the kind provided with inlets and outlets and valve mechanism such as I employ when my invention is adapted for use as a pump or compressor, or driven by a motor, engine or other source of power.
Figure 2:
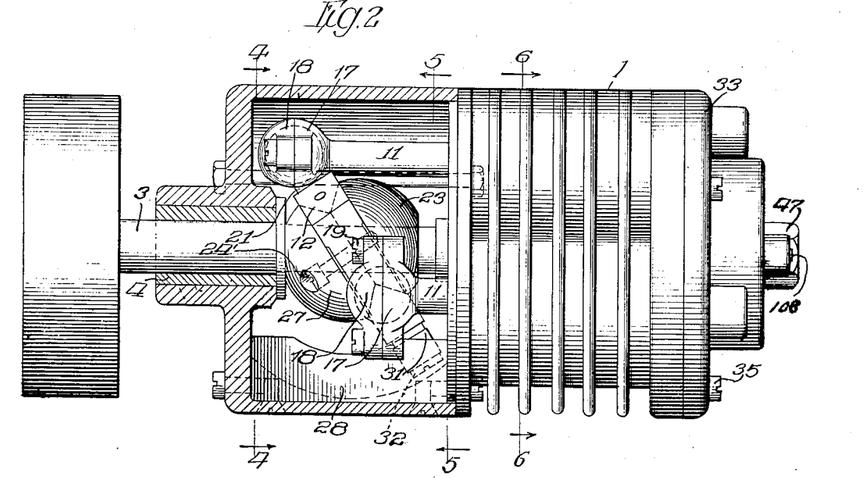
Fig. 2 is a view in side elevation of the device shown in Fig. 1, with the casing which forms the pitman chamber shown in central longitudinal section.
Figure 3:
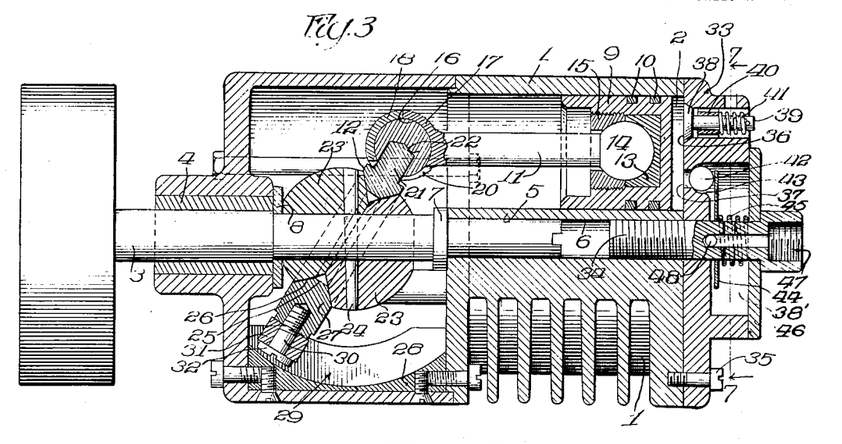
Fig. 3 is a view in central longitudinal section, taken on line 3 of Fig. 1, looking in the direction indicated by the arrows, but with the pitman-operating mechanism in the position in which it would appear when moved to the extreme limit of its motion from the position shown in Figs. 1 and 2.
Figure 4:
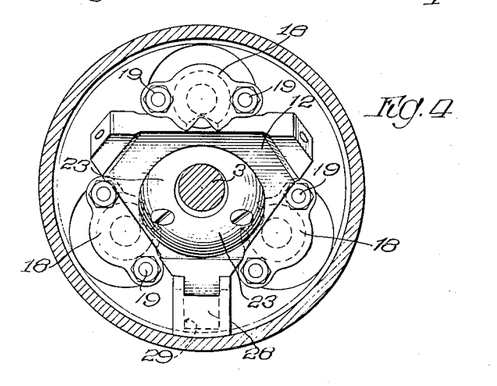
Fig. 4 is a transverse sectional view taken on line 4 of Fig. 2, looking in the direction indicated by the arrows.
Figure 5:
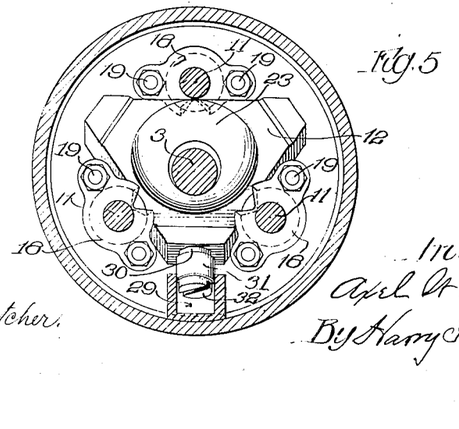
Fig. 5 is a similar transverse sectional view taken on line 5 of Fig. 2, looking in the opposite direction, as indicated by the arrows; and shows the pitman rods in section.
Figure 6:
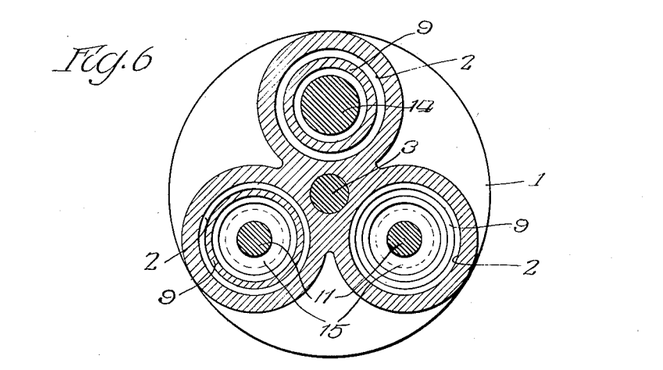
Fig. 6 is a view in transverse section, taken on line 6—6 of Fig. 2, looking in the direction indicated by the arrows.
Figures 7, 10A:
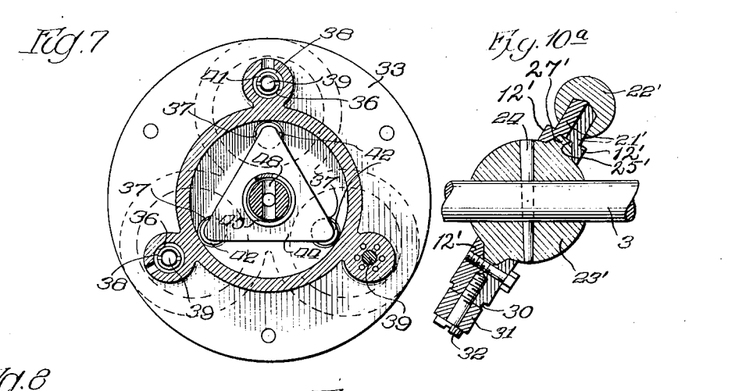
Fig. 7, is a detail view in transverse section, taken on line 7—7 of Fig. 3, looking in the direction indicated by the arrows, and shows the inlets and outlets for the three piston chambers and the valve mechanism for the same, all in one cylinder head, which is removable and adapted to be used interchangeably with respect to other cylinder heads having other forms of valve mechanism and inlet and outlet ports, so as to enable the device to be converted from a pump to a fluid pressure motor or engine, or from an engine to a pump or compressor, as desired.
Figure 8:
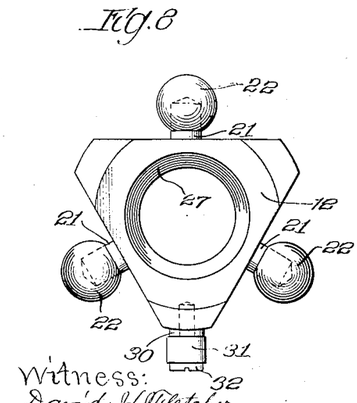
Fig. 8 is a detail view in elevation of the outer one of the relatively rotatable pitman-operating members, or cam or connecting and operating members, for operatively connecting the shaft and piston mechanism.
Figure 9:
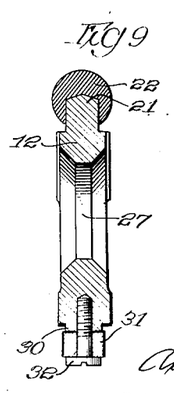
Fig. 9 is a detail view in central transverse section, of the part or member shown in Fig. 8.

In Figs. 1, 2 and 3, the device is shown with a cylinder head having inlet and openings communicating with the three piston chambers, and provided with valve mechanism adapted to enable my invention to be used as or in connection with a pump or fluid compressor. The cylinder-head, and valve mechanism shown in said figures and in Fig. 7, is constructed as follows:

The cylinder-head 33 is of such form and size as to form a closure for all of the piston chambers 2 formed by the casing or cylinder 1, and is removably secured to the casing 1 by means of a central threaded stem 34 which projects inward from the flat inner surface of the head and is in threaded engagement with the threaded axial bore 6 of the casing; and outer securing rods or bolts 35 suitably headed and extending through suitable openings in the head, and having their threaded ends anchored in or secured to the casing, serve as an additional securing means, for removably securing the head, or any other interchangeable cylinder-head in position upon the casing.

The cylinder-head 33 is provided with an inlet port 36 for each piston chamber, and with an outlet port 37 for each piston chamber. Each outlet port 37 communicates with a piston chamber 2 and with an exhaust chamber 38', which may be in the form of a single exhaust chamber adapted to communicate with all of the exhaust ports 37. Each inlet port is provided with a suitable inlet valve 38 having a valve stem 39 slidably mounted in a bearing 40, and having a spring 41 in operative engagement with the valve stem, and adapted to yieldingly hold the movable valve member 38 in its valve seat, so as to control, or open and close the inlet port 36 in which such valve is mounted.

Each outlet port 37 is provided with a movable valve member which is, by preference, in the form of a ball check valve 42 yieldingly held in position to yieldingly engage its valve seat 43 by means of a metallic plate 44, which is located in the exhaust chamber 38 in position to engage all of the valve balls 42. The metallic plate 44 is yieldingly held in engagement with the balls 42 by means of a spring 45 which is interposed between said plate and an outer plate or exhaust-chamber wall 46, which may be held in place by the central stud 34 already mentioned, or by any ordinary well known or desired securing means. The stud or bolt 34, shown in Fig. 3, has an axial outlet opening 47 therein, which is connected with the exhaust chamber 38 by means of one or more openings 48. The outer extremity of the stem or bolt 34 is enlarged and provided with an inner screw thread, adapted to enable it to be connected with a suitably threaded pipe or conduit, forming an outlet passage or leading to any desired form of receptacle into which fluid forced from the piston chambers is to be discharged through the discharge passage 47.

In Figs. 12 to 15 inclusive, the device shown in Figs. 1, 2 and 3, with the head 33, removed, is shown provided with a cylinder-head 49 which is adapted to be used interchangeably, if desired, with respect to the head 33, and which whether permanently secured in position or removably secured to the casing 1, is adapted to enable my invention to be used as an internal combustion engine, said head 49 being provided with inlet and outlet openings, and valve mechanism including valve-operating mechanism, suitable for use in connection with and forming essential parts of an internal combustion engine.

The cylinder-head 49 is of such form and size as to form a closure for all of the piston chambers 2, formed by the casing or cylinder 1, and is provided with an inlet port 50 for and communicating with each piston chamber 2, respectively, and has an outlet port 51 for and communicating with each piston chamber 2, respectively. In the construction shown, the head is provided with and forms an intake chamber 52 with which all of the inlet ports 50 communicate, and having a main intake passage 53, adapted to communicate with a carbureter or suitable source of combustible fluid supply. (See Figs. 12, 13 and 14.) The head 49 also forms a similar curved exhaust chamber 54 which communicates with all of the valve-controlled outlet ports 51, and with one or more exhaust passages 55. (See Figs. 12, 13 and 14.)

The cylinder head 49 is chambered on its inner side so as to form a plurality of combustion chambers 56—one for each piston chamber 2 of the casing 1; and is provided with a spark plug 57 for each combustion chamber, and each provided with suitable electric wires 58 connected therewith and adapted to embrace said spark plugs in a circuit having a suitable commutator or timer, which may be of any desired ordinary and well known or suitable form adapted to cause the spark plugs to ignite the charges of combustible fluid in the respective combustion chambers, at the proper times. Such ignition devices including commutators being familiar and well known to those skilled in the art, it is not deemed necessary or desirable to show or describe the same herein in order to enable the invention to be understood.

The head is provided with a central hollow stem 59 which is, by preference, screw threaded, and in threaded engagement with the threaded bore 5 of the casing or cylinder 1 already described. And outer securing rods or bolts 35, already described, are inserted through suitable openings in the head 49, and into the casing, so as to securely hold the head in operative position on the casing. I prefer to secure the cylinder head 49 removably in position upon the casing, so that it may be readily used interchangeably with other heads, such as the head 33, as desired.

Each inlet port 50 is provided with a movable valve member 60 having a valve stem 61 slidably mounted in a suitable supporting bearing 62, and provided with a spring 63 in operative engagement with said valve stem, and adapted to yieldingly hold the valve member 60 in engagement with its valve seat 64, and to permit the valve to be pressed out of engagement with its seat by means of the valve-operating mechanism hereinafter described.

Each outlet port 51 is provided with a movable valve member 65 having a stem 66 slidably mounted in a supporting bearing 67; and a spring 68 is mounted in operative engagement with each of said valve stems and adapted to yieldingly hold the valve members 65 yieldingly in engagement with their valve seats 69.

Figure 13:
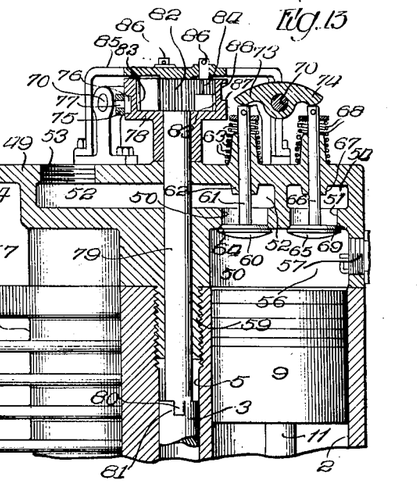
Fig. 13, is a view in central longitudinal section, taken on line 13 of Fig. 12, looking in the direction indicated by the arrows, and showing the valve mechanism in the position which it would occupy when the inlet and outlet valves shown are both closed, or in normal or neutral position; and showing the cam and gear mechanism for operating the inlet and outlet valves of the three piston cylinders.
Figure 14:
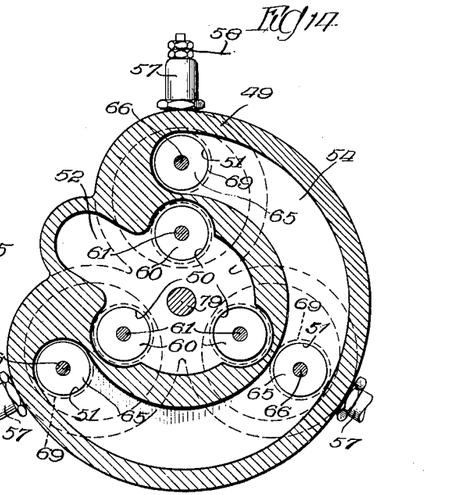
Fig. 14, is a view in transverse section, taken on line 14—14 of Fig. 11, looking in the direction indicated by the arrows, and showing the arrangement of the inlet and outlet ports, and the intake chamber and exhaust chamber in the cylinder head, as well as the spark plugs.
Figure 16:
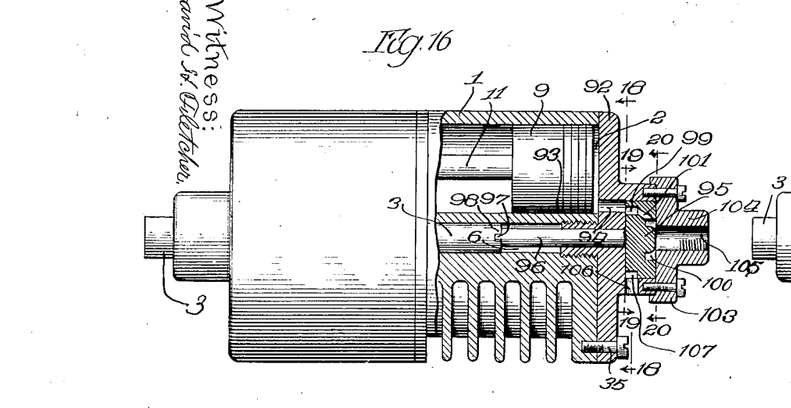
Fig. 16, is a view in side elevation, partly in section, of the mechanism shown in Fig. 3, but with a cylinder head provided with inlet and outlet openings and valve mechanism adapted to enable my invention to be employed as an air motor or steam engine, the cylinder head and valve mechanism shown in said figure being employed instead of the cylinder head shown in Figs. 1 and 3 inclusive, and instead of the cylinder head and valve mechanism shown in Figs. 11 to 14 inclusive, and being adapted to be used interchangeably with respect to said last-mentioned cylinder heads respectively.
Figure 17:
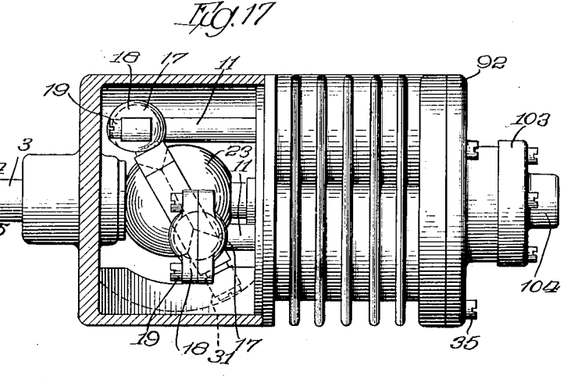
Fig. 17, is a view in side elevation, partly in central longitudinal section through the pitman casing, but showing the piston-operating mechanism in side elevation.
Figure 18:
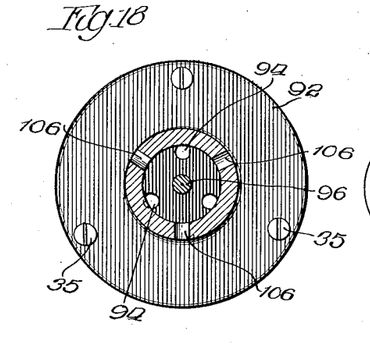
Fig. 18, is a transverse sectional view taken on line 18—18 of Fig. 16, looking in the direction indicated by the arrows, and showing the arrangement of the inlet and outlet openings for the three piston chambers all in one cylinder head.
Figure 19:
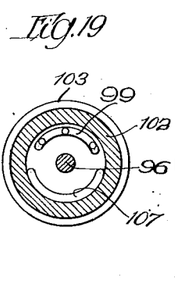
Fig. 19, is a detail view in transverse section, taken on line 19—19 of Fig. 16, looking in the direction of the arrows, and showing the segmental inlet and outlet ports in the rotary valve member, for controlling the inlets and outlets of the three piston chambers, which inlets and outlets are shown in Fig. 18.
Figure 20:
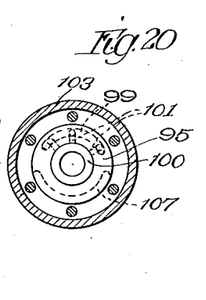
Fig. 20, is a detail view in transverse section, taken on line 20—20 of Fig. 16, showing the rotary valve in operative position in its valve seat in the cylinder head.

Each combustion chamber 56 or piston chamber 2 is provided with a stub rock shaft 70 having its opposite extremities journaled in bearing brackets 71 secured to the head by means of screws 72 or other suitable securing means. Each of these rocking stub shafts 70 has a valve-operating lever arm 73 in operative engagement with a corresponding adjacent valve stem 61 of an inlet valve 60; and a similar valve-operating lever arm 74 is fixed to each rocking stub shaft 70 in position to project outward from said shaft and into operative engagement with a corresponding adjacent valve stem 66 of an outlet valve 65, the arms 73 and 74 being so positioned that the rocking of the shaft in one direction will open the corresponding inlet valve, and the rocking of the said shaft in an opposite direction will open the corresponding outlet valve; and, when the rock shaft is in position to support the lever arms 73 and 74 in intermediate position, as shown in Fig. 13, both the inlet and outlet valves will be held closed by the spring mechanism.

Each valve-operating rocking shaft 70 is provided with an operating lever 75 fixed thereto, on the swinging or free inner end of which is rotatively mounted an anti-friction roller 76 mounted upon a horizontal axle 77 which projects outward laterally from such lever. A cam 78 is mounted on the cylinder head 49 in position to encircle and to rotate freely with respect to the outer projecting end of a stub shaft 79 the inner end of which is secured in fixed relation to and adapted to rotate with the shaft 3 already described. The connection between the adjacent abutting ends of these shafts may be made by means of a transverse tongue 80 on one of said shafts, and a groove 81 in the end of the other shaft, and adapted to admit the tongue. The shafts 79 and 3 are thus readily separable, for convenience in assembling, or taking the mechanism apart, although it is obvious that the shaft or extension 49 may be made in one integral piece with the shaft 3, if desired.

Fixed to the other projecting end of the shaft 49 is a spur pinion or gear 82. The cam 78 is provided with an inner toothed gear 83, and a set of spur pinions 84—preferably three—is provided, for operatively connecting the toothed gear members 82 and 83. Each spur pinion 84 is rotatively mounted upon a supporting bracket 85 by means of a stub shaft or axle 86, in such position that said spur pinions are equal distances from each other and at equal distances from the axis of the shaft 79, and between and in toothed engagement with the gears 82 and 83. The pitch lines of said gears 82 and 83 are of such relative dimensions or diameter, that the pinion or gear 82 and shaft 79 will rotate twice to each revolution of the cam 78. And the cam 78 has a peripheral cam groove or cam face 87, which may form the bottom wall of a circumferential cam groove 88, into which each of the rollers 76 extends in position to be engaged by the top and bottom walls of said cam groove. The cam groove is curved or sinuous, having a high part or curve 89, for raising the roller supporting end of each lever 75, to open the corresponding outlet valve and close the corresponding inlet valve; and having a lower groove part or curve 90, for lowering each roller-supporting end of each valve-operating lever arm 75, in its turn, to open the corresponding inlet valve, and permit the corresponding outlet valve to be held closed by its spring. And the cam groove has intermediate groove portions 91 adapted to guide the roller-supporting end of each valve-operating lever 75 between the upper and lower curves of the cam groove, so that the corresponding inlet and outlet valves will be both closed simultaneously at the proper times and for the desired intervals of time, when the engine is in operation. (See Figs. 12 to 15 inclusive.)

In Figs. 16 to 20, inclusive, is shown a cylinder head provided with inlet and outlet openings for the piston chambers, and valve mechanism, for controlling such inlet and outlet ports, adapted to enable the invention to be applied and used as an air motor or steam engine, said cylinder head being adapted to be used interchangeably with respect to the cylinder heads 33 and 49 already described. The cylinder head 92, shown in Figs. 16 to 20, inclusive, is constructed as follows: It is of such shape and size as to form a closure for all of the piston chambers 2, and is provided with a central threaded stem 93 which has an axial bore or opening therethrough and is adapted to be inserted into and secured in threaded engagement with the threaded bore 5 already described. And outer securing bolts 35, already described, suitably headed, are adapted to extend through suitable openings in the head, and to be secured to the casing by means of nuts or other securing means, so as to securely hold the head in position upon the casing.

The cylinder head 92 is provided with a port 94 for each piston chamber. Each port 94 communicates with a separate piston chamber 2, and is adapted to serve as both the inlet and the outlet port for such chamber, alternately. These ports 94 are located at equal distances from each other and at equal distances from the axial center of the hollow axial stem 93. A rotative valve 95 having an inner surface adapted to close and permit the opening of the ports 94 successively, is rotatively mounted in engagement with the valve seat or surface portion of the head through which the perforations 94 lead from the piston chambers, said valve member being provided with a valve stem 96 journaled in the axial bore in the stem 93, and having its inner end connected in fixed relation to and adapted to rotate with the shaft 3. The valve stem 96 may be connected with the shaft 3 by means of a transverse tongue 97 on the end of one of said members, and a transverse groove in the end of the other of said connected members adapted to admit the tongue. The stem is thus readily removable from engagement with the shaft.

The rotative valve member 95 is provided with an elongated segmental or curved inlet port 99 in its inner face located in position to open and permit the closing of the ports 94 successively, as the valve is rotated. Said rotative valve member 95 also has an annular groove in its outer face forming an annular inlet port or chamber 100 which is connected with the segmental or curved inlet port 99 in said valve member by means of one or more connecting passages 101. And the rotative valve member 95 is rotatively mounted in a circular chamber formed by an annular rim or wall 102, to which is secured a cover 103 having a nipple 104 provided with a fluid inlet or supply passage 105 which communicates with the annular inlet port 100 in the rotative valve member. The supply passage 105 is, of course, connected with a source of fluid supply, and the nipple 104 is provided with screw threads or other securing means, adapted to enable the nipple and the passage in the nipple to be connected with a suitable source of fluid supply which may be in the form of a steam boiler, or compressed air chamber, or other pressure fluid supply.

The rim or wall 102 of the valve chamber in which the rotative valve member 95 is rotatively mounted, is provided with an outlet port 106 for each piston chamber, said outlet ports being located at equal distances from each other and intermediate the ports 94 already described, each port 106 being at equal distances from the ports 94 between which it is located. These outlet ports 106 each communicate with the peripheral portion of the chamber containing the valve 95 at a point outside of the path of movement of the curved inlet port 99 in said valve member, and outside of the ports 94; and the rotative valve member 95 is provided with an outer curved segmental outlet port 107 in or near its periphery and in position to open and permit the closing of the outlet ports 106 successively as the valve member is rotated. This relatively long outer curved outlet port 107 is of sufficient length, and located in such position in the rotative valve member 95, as to connect each port 94—communicating with a piston chamber—with an adjacent outlet port 106 in successive order, as the rotative valve is rotated.

Figure 10:
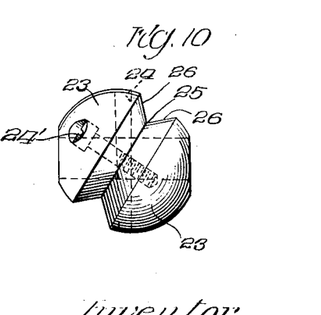
Fig. 10, is a detail view of the inner one of the relatively rotatable pitman-operating or piston-operating members, for operatively connecting the piston and pitman mechanism with the shaft on which said inner member is mounted or may form a part.
Figures 11, 15:
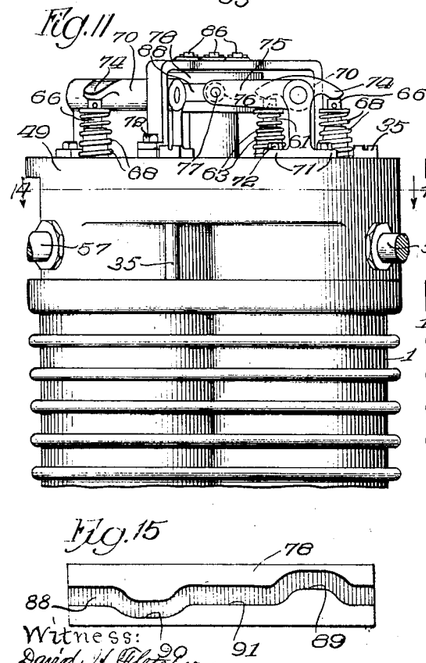
Fig. 11, is an enlarged view in elevation of the piston cylinder shown in Figs. 1, 2 and 3, with the other parts shown in said Figs. 1, 2 and 3, broken away or omitted; but with a cylinder head provided with inlet and openings, and valve mechanism suitable for use when my invention, or the mechanism shown in Figs. 1, 2, and 3, is to be employed as a gas or internal combustion engine, with the cylinder head and valve mechanism shown in Fig. 11 substituted for the cylinder head and valve mechanism shown in said Figs. 1, 2 and 3.
Fig. 15, is a diagrammatic view of the cam for operating the valve mechanism shown in Figs. 11 to 14 inclusive, showing the sinuous cam groove or lever-operating cam portion as it would appear if developed upon a flat surface.
Figure 12:
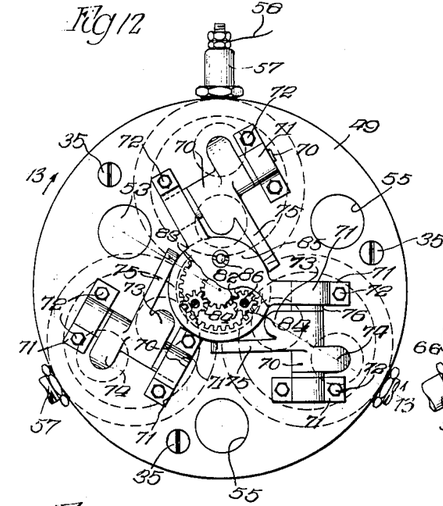
Fig. 12, is a view in end elevation of the mechanism shown in Fig. 11.

In Fig. 10ª is shown a modified form of piston-operating mechanism in which the inner piston-operating member 23', which is spherical and in one piece, and fixed to the shaft 3 by means of a tapered pin 24, corresponds with the grooved spherical cam member 23 already described; and the collar member 12', which is made in two sections rigidly secured together by screws 13', corresponds with the outer or collar member 12 already described; and the balls 22', of which there are three, one for each radial arm 21', correspond with the balls 22 already described. The radial arms 21' correspond with the radial arms 21 already described; and said balls 22' and arms 21' operate in the same manner and are connected with the pitmen 11 in the same manner as balls 22 and arms 21. The only differences in construction or operation between the parts 23 and 23' is that the latter is provided with an annular projecting peripheral tongue or flange 27' encircling the part 23' in a plane which is at an oblique angle with respect to the axis of rotation of the part 23' and shaft 3, instead of having a groove 25, said tongue being adapted to extend into and in movable relation to a corresponding cam groove or inner annular groove 25' in and formed by the collar member 12'. The balls 22' serve also as a securing means for holding the two sections of the collar 12' together, the two parts of the arms 21' being securely held together by the corresponding ball members 22' which are provided with recesses adapted to tightly fit the ends of the corresponding arms 21' admitted into such recesses. The collar 12' is, by preference, of the same outer triangular form as the collar member 12, and, with the exception of the reversal of the tongue and groove parts, the members 12' and 23' are adapted to operate in the same manner as parts 12 and 23 already described.

In Figs. 1 and 2 is shown a safety valve 108, which may be of any ordinary and well known or suitable form of safety valve, such, for instance, as those in common use having a spring-pressed movable valve member provided with a valve stem mounted in a suitable supporting bearing, and adapted to close an outlet passage leading from the compression or exhaust chamber 38', so long as the pressure is not sufficient to overcome the tension of the valve spring, the spring being of suitable strength to resist the pressure in the chamber up to the desired predetermined degree of pressure, and to permit the valve to open when the pressure becomes excessive. Such safety valves being familiar and well known to those skilled in the art, it is not deemed necessary or desirable to further describe or illustrate the same herein.

I claim:

1. In a mechanism of the class described, the combination of a plurality of pistons, a casing forming piston chambers in which said pistons are mounted, a shaft journaled in the casing in rotative relation to the piston chambers, piston-operating mechanism comprising in its construction a cam connected with and encircling the shaft, and an oscillating member rotatively mounted with respect to and encircling the cam, one of said two last-mentioned members being provided with a circular cam groove located in a plane in oblique relation to the axis of rotation of the cam, and the other one of said two last mentioned members being provided with a cam-engaging portion arranged in position to extend into and in sliding engagement with said circular cam groove, means for operatively connecting said oscillating cam-engaging member with the piston mechanism, a guide mounted adjacent to said oscillating member and in fixed relation to said casing and piston chambers, a radial guiding arm on said oscillating member and in operative engagement with said guide, a cylinder head forming a closure for all of said piston chambers, and provided with fluid passages communicating with each of said piston chambers respectively, a rotative valve member mounted upon said cylinder head and adapted to cover and uncover each of a plurality of said fluid passages in the required order, and means for operatively connecting said rotative valve member with said shaft.

2. In a mechanism of the class described, the combination of a plurality of pistons, a casing forming piston chambers in which said pistons are mounted, a shaft journaled in the casing in rotative relation to the piston chambers, piston-operating mechanism comprising in its construction a cam fixed to and encircling the shaft, and an oscillating member rotatively mounted with respect to and encircling the cam, one of said two last-mentioned members being provided with a circular cam groove disposed in a plane which is oblique with respect to the axis of rotation of the cam, and the other one of said two last mentioned members being provided with a cam-engaging portion arranged in position to extend into and in rotative engagement with said circular cam groove, a pitman connected with each of said pistons respectively, connecting means forming an articulate connection between each pitman and said oscillating cam-encircling member, a guide mounted adjacent to said oscillating cam-encircling member and in fixed relation to said casing and piston chambers, means for operatively connecting said cam-encircling oscillating member with said guide, a cylinder head forming a closure for all of said piston chambers, and provided with a fluid passage for each piston chamber, each of said passages acting to form an inlet and an outlet alternately, for the piston chamber with which such passage communicates, a rotative valve member mounted upon said cylinder head and adapted to cover and uncover each of said fluid passages in the required order, and means for operatively connecting said rotative valve member with the shaft.

3. In a mechanism of the class described, the combination of a plurality of pistons, a casing forming piston chambers in which said pistons are mounted, and provided with fluid passages for said piston chambers, a shaft journaled in the casing in rotative relation to the piston chambers, piston-operating mechanism comprising in its construction a cam fixed to and encircling the shaft, and an oscillating member mounted in rotative relation to and encircling the cam, one of said two last mentioned members being provided with a circular cam groove disposed in a plane which is in oblique relation to the axis of rotation of the cam, and the other one of said two last mentioned members being provided with a cam engaging portion extending into and in movable engagement with said circular cam groove, a pitman connected with each of said pistons respectively, a plurality of radial pitman-operating arms upon and in fixed relation to said oscillating cam-encircling member, a ball upon the outer extremity of each of said radial arms, a socket upon the outer end of each pitman and encircling and in engagement with a corresponding one of said balls, and guiding mechanism in operative engagement with said cam-encircling oscillating member.

4. In a mechanism of the class described, the combination of a plurality of pistons, a casing forming piston chambers in which said pistons are mounted, and provided with fluid passages for said piston chambers, a shaft journaled in the casing in rotative relation to the piston chambers, piston-operating mechanism comprising in its construction a cam fixed to and encircling the shaft, and an oscillating member mounted in rotative relation to and encircling the cam, one of said two last mentioned members being provided with a circular cam groove disposed in a plane which is in oblique relation with respect to the axis of rotation of the cam, and the other one of said two last mentioned members being provided with a cam-engaging portion extending into and in movable engagement with said circular cam groove, a pitman connected with each of said pistons, respectively, a socket upon the outer end of each pitman, each of said sockets having a lateral opening located in the side of the pitman which faces toward the axial center of the cam, a plurality of radial pitman-operating arms fixed to said oscillating cam-encircling member and each extending into one of said lateral openings in the socket portion of a corresponding pitman, a ball upon the outer extremity of each of said radial arms and encircled by a corresponding socket portion of an adjacent pitman, and guiding mechanism for guiding said oscillating cam-encircling member.

5. In a mechanism of the class described, the combination of a plurality of pistons, a casing forming piston chambers in which said pistons are mounted, a cylinder head forming a closure for all of said piston chambers and provided with fluid passages communicating with each of said piston chambers, movable valve mechanism having a rotative valve member formed in one integral piece and mounted on said cylinder head in position to cover and uncover said fluid passages in the required order, a shaft journaled in the casing in rotative relation to the piston chambers, piston-operating mechanism comprising in its construction a cam fixed to and encircling the shaft and an oscillating member mounted in rotative relation to and encircling the cam member, one of said two last mentioned members having a circular cam groove disposed in oblique relation with respect to the axis of the cam, and the other of said two last mentioned members being provided with a cam-engaging member extending into and in movable relation to said circular cam groove, a plurality of pitmen each connected at one end with a corresponding piston and at its opposite end with said oscillating member, and means for operating said movable valve mechanism for controlling said fluid passages.

Signed at Chicago, Illinois, this 3rd day of March, 1919.

AXEL W. MOODY.

Witnesses:
DAVID H. FLETCHER,
HARRY I. CROMERS.